Feb. 1, 1944.   F. C. FARNHAM   2,340,314
SEISMIC SURVEYING
Filed July 24, 1943
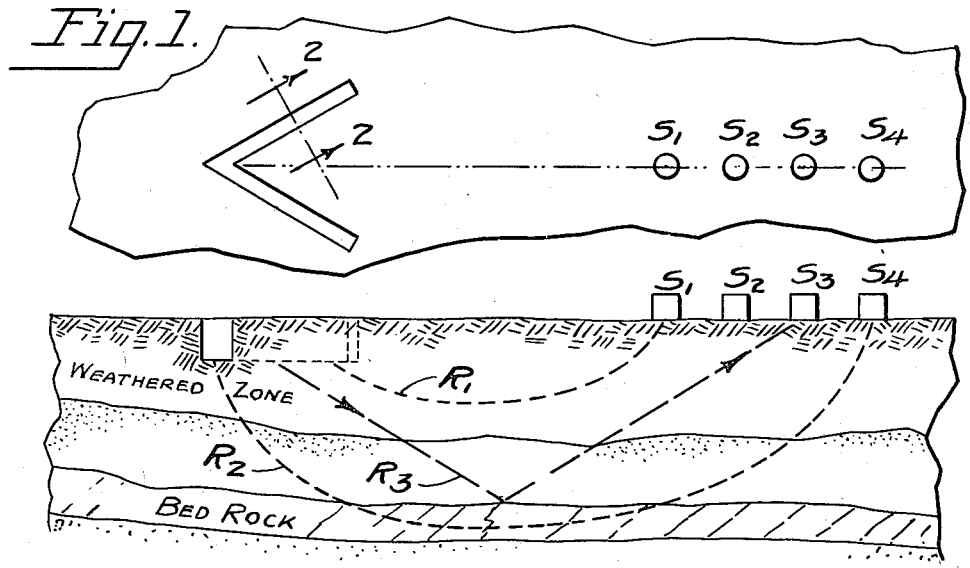
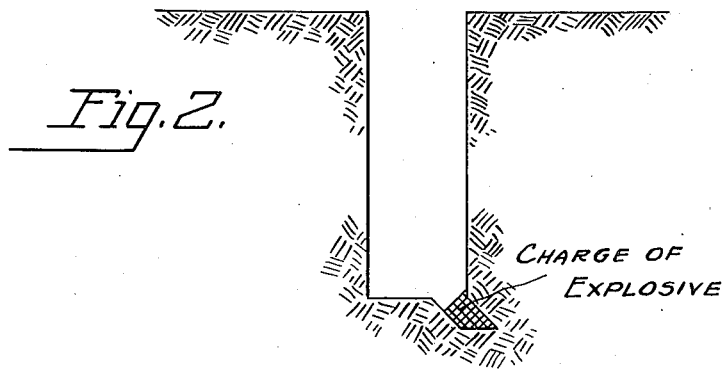
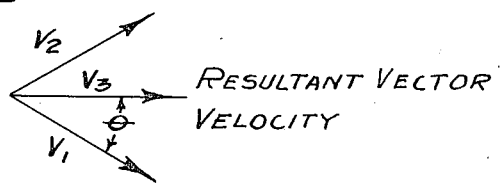
INVENTOR
FRANK CECIL FARNHAM
BY
ATTORNEY

Patented Feb. 1, 1944

2,340,314

UNITED STATES PATENT OFFICE 2,340,314

SEISMIC SURVEYING

Frank Cecil Farnham, Rolla, Mo.

Application July 24, 1943, Serial No. 495,996

5 Claims. (Cl. 181—0.5)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to seismic prospecting or surveying, and more particularly to a seismic surveying method wherein the source of seismic energy is an explosive charge. Still more particularly, this invention relates to a method for distributing the explosive charge and provides criteria for selecting the quantity and type of explosive as well as its arrangement.

The invention finds its greatest utility in refraction seismic surveying for the purpose of measuring the depth to bed-rock under a deep overburden such as several hundred or even a few thousand feet in which case the distance from shot point to farthest detector position is 1,000 to 5,000 feet or more, but the invention is not limited thereto, having great utility in any refraction seismic survey and also in reflection seismic survey. The discussion which follows applies to the use of the invention in connection with refraction surveys and the bed-rock or other high-speed bed to which the depth is being measured will be referred to as the "earth structure being surveyed" or "earth structure."

Heretofore, it has been customary to arrange a line of detectors for detecting the seismic disturbances over the geological area to be explored or surveyed, and to detonate a single charge of explosive spaced apart from the detector alignment, whereby the various seismic waves created are recorded by the detectors. From a study of the seismographic records produced, an accurate estimate of the depth and inclination of the subsurface strata can be made. In order to secure a more pronounced seismic disturbance, larger charges of explosive have been employed without, however, securing a corresponding increase in the seismic wave energy. This has been particularly true in areas where the upper weathered zone has been loose, soft, sandy or otherwise readily deformable. It has now been discovered that the type and distribution of the explosive charge exerts a pronounced effect upon the amount of energy carried by the seismic wave created.

Accordingly, it is an object of this invention to provide an improved method of arranging the explosive charge employed to create the seismic disturbances. Another object of the present invention is to focus the created seismic energy in such a direction that the refracted or reflected waves will carry a maximum of energy to the seismographic detectors. Yet another object of this invention is to provide criteria for determining the amount and type of explosive which will produce the most effective seismic disturbances. Other objects and advantages of the invention will be apparent as the ensuing description proceeds.

In accordance with the present invention, the disadvantages of the prior methods are overcome and an improved arrangement of the explosive charge is provided by arranging the detectors in general alignment with the explosive charge, distributing the explosive charge in generally V-shaped alignment, having the apex of the V pointed away from the detectors and having the alignment of detectors approximately bisecting the interior angle formed by the distributed explosive charge, adjusting the interior angle formed by the V-shaped explosive charge to render the vector component of the explosive propagation velocity toward the detectors approximately equal to the seismic wave propagation velocity inherent in the earth structure being surveyed, and initiating the explosion at the apex of the V-shaped distributed explosive charge. It is well known that for any earth structure being surveyed, there exists an inherent velocity of propagation for seismic waves, which can be determined by known methods forming no part of the present invention.

The velocity of propagation of the explosive wave through a charge of explosive may substantially exceed the foregoing velocity of propagation inherent in the earth structure being surveyed. It has been discovered that when the explosive charge is arranged in a generally V-shaped manner at or near the surface of the earth and is detonated by a seismic cap at the apex of the explosive charge, the vector component, directed toward the detectors, of the explosive velocity of propagation can be matched to the inherent seismic wave velocity of propagation through the earth structure. The procedure for accomplishing this will be explained in detail hereinafter.

Referring now to the single sheet of accompanying drawings:

Figure 1 represents a line of detectors spaced from the explosive charge arranged in generally V-shape.

Figure 2 is a sectional view of a preferred trench arrangement along the line 2—2 of Figure 1.

Figure 3 is a vertical sectional view through the ground showing the arrangement of the explosive and the approximate paths of the various refracted and reflected seismic waves, designated $R_1$, $R_2$, and $R_3$.

Figure 4 is a vector diagram illustrating the manner in which the explosive charge is arranged to secure the optimum seismic wave energy.

In the drawing, and referring now to Figure 1, the detectors are shown at $S_1$, $S_2$, $S_3$, and $S_4$, arranged in general alignment to bisect the angle formed by the distribution of the explosive charge which in turn is in generally V-shaped alignment. The length of each leg of the V is determined by the amount of explosive employed and the elastic limit of the ground in which the charge is placed.

The explosive charge is preferably arranged at the bottom of a trench offset from the center thereof and on the side toward the line of detectors, as shown in Figure 2.

It has also been discovered that any particular unconsolidated overburden has a natural period of vibration and hence will transmit satisfactorily waves of only one frequency. The maximum amount of the energy developed by an explosive blast will be transmitted away from the blast as seismic energy when the rate of pressure development in the blast is matched to the free period of the ground in which the charge is placed. Therefore, since the rate of pressure development is dependent on the amount and type of explosive, it should be adjusted to the free period of the ground being surveyed. For many types and quantities of explosives the determination of the time in which the maximum development of pressure is observed has not been quantitatively determined. However, it has been found that a preferred range of explosives includes an explosive charge whose maximum pressure is developed at least as rapidly as in the detonation of 10 lbs. of 30% dynamite and not more rapidly than in 250 lbs. of 90% dynamite. It is then readily apparent that a few simple trials of charges and varieties of explosives within the foregoing range will give the optimum seismic wave energy.

It has further been discovered that soft, sandy and otherwise unconsolidated earth will transmit only a small amount of seismic energy per unit area, and therefore, the explosive charge must be distributed in such a manner as to increase the area through which the explosive energy is transmitted to the earth structure. This is accomplished by distributing the explosive charge over a plurality of points or preferably in one elongated continuous charge. While the explosive can be distributed directly upon the surface of the ground, it has been found that somewhat better results are secured when it is disposed at the bottom of a shallow trench of from 2 to 8 feet in depth, and preferably from 3 to 6 feet in depth. A still further increase in the strength of the seismic wave generated can be secured when the explosive charge is recessed along the interior bottom corner of the trench (illustrated in the drawing, Figure 2).

In the distribution of the explosive charge, each leg of the V-shaped charge should be of such a length that the elastic limit of the earth structure at any given point is not substantially exceeded. Thus, for the ordinary type of earth structure encountered in seismic surveying, it has been found that the length of each leg should be from 5 to 100 feet in length and usually from about 5 to 25 feet in length. Thus, by distributing the explosive in the foregoing manner, a progressive increase in the quantity of explosive employed results in a progressive increase in the strength of the seismic wave generated upon detonation of the explosive.

In order properly to focus the seismic wave, the explosive charge is arranged in a generally V-shape, at or near the surface of the ground so that an extension of the line of detectors bisects the angle formed by the V. The angle of the V is determined as follows:

The velocity of blast propagation of many explosives is not well known, nor can it be easily determined, but the employment of an explosive detonating fuse of known explosive propagation velocity, such as that known to the trade as "Primacord" fuse, reduces the explosive propagation velocity to a fixed quantity. The explosive velocity of "Primacord" fuse is known to be about 20,000 ft. per second. The velocity of seismic wave propagation through the earth structure can be determined by well known means, and for purposes of illustration, can be assumed to be 14,000 ft. per second. Therefore, by vectorial methods, the angle intercepted by the V-shaped charge arrangement is adjusted so that the vector component of the explosive velocity wave in the direction of the detectors is equal to 14,000 ft. per second, the inherent propagation velocity of the earth structure.

Referring to Figure 1, when the explosive charge is detonated at the apex of the V-shaped trench, the explosive wave is propagated along each leg of the trench at a velocity of 20,000 ft. per second, by a "Primacord" fuse inserted in the explosive. If the propagation velocity of the earth structure is determined to be 14,000 ft. per second, then the angle intercepted by the V-shaped charge arrangement is made equal to 90° by conventional vectorial methods to render the vector component of the explosive velocity toward the detectors equal to 14,000 ft. per second. Similarly, when the earth structure has a seismic wave propagation velocity of 10,000 ft. per second, the angle between the two branches of the trench would be made equal to 120° through similar vectorial methods. This results in a seismic wave being generated which is the optimum for the earth structure being surveyed, and creates the maximum seismic energy for recording at the detectors.

Although the detonation velocity of the explosive charge has been mentioned in terms of dynamite of various percentage strengths, other explosives can be employed as well, such as blasting gelatine, black powder, smokeless powder in sizes ranging from rifle power to cannon powder, cordite, and any other explosive which has a time at which the maximum pressure is achieved equivalent to the range previously mentioned.

Although a "Primacord" detonating fuse manufactured by the Primacord-Bickford Co. is a preferred detonating fuse, equivalent types of detonating fuse can of course be employed.

While the explosive charge arranged in generally V-shape has been illustrated and described as lying in a plane generally parallel to the earth surface, the charge can, of course, be arranged with the ends of the charge at a substantially greater depth than the apex thereof or vice versa, depending on whether or not it is desired to focus the seismic waves in a horizontal direction or in a downward direction, such as is employed in reflection methods of seismic surveying. It follows, accordingly, that while the invention finds its greatest utility in refraction methods of seismic surveying, it is also extremely useful in reflection methods.

As above outlined and described, the explosive charge is generally arranged in a continuous V-shape, but the invention also contemplates the employment of a plurality of separate charges, arranged in generally V-shaped arrangement, which can be detonated successively from the apex thereof down the legs of the V by an explosive fuse or by a plurality of electric detonating caps fired in sequence from a commutator.

Since many different embodiments of the invention will be apparent, various changes can be made without departing from the spirit and scope of the invention.

What is claimed is:

1. In a method of seismic surveying wherein a charge of explosive is detonated and the resulting seismic waves are detected and recorded, the steps which comprise, arranging the detectors in general alignment with the explosive charge, distributing the explosive charge in generally V-shaped alignment having the apex of the V pointed away from the detectors and having the alignment of detectors approximately bisecting the interior angle formed by the distributed explosive charge, adjusting the interior angle formed by the V-shaped explosive charge to render the vector component toward the detectors of the explosive propagation velocity approximately equal to the seismic wave propagation velocity inherent in the earth structure being surveyed, and initiating the explosion at the apex of the V-shaped distributed explosive charge.

2. The method of claim 1, wherein for any total explosive charge the legs of the V-shaped distributed explosive charge are of such a length that the elastic limit of the earth structure being surveyed is approached but not substantially exceeded, whereby the maximum seismic energy is delivered to the earth structure.

3. The method of claim 1, wherein each leg of the V-shaped charge is from 5 to 100 feet long.

4. The method of claim 1, wherein the amount and type of explosive are such that the maximum explosure pressure is achieved in a time substantially equal to one-fourth the natural free period of vibration of the material in which the explosive charge is placed.

5. The method of claim 1, wherein an explosive charge is employed which achieves its maximum explosive pressure at least as rapidly as ten pounds of 30% dynamite and not more rapidly than 250 pounds of 90% dynamite.

FRANK CECIL FARNHAM.